(12) United States Patent
Mc Kenna

(10) Patent No.: US 6,464,379 B1
(45) Date of Patent: Oct. 15, 2002

(54) STROBE LIGHTING ASSEMBLY FOR A MOTORCYCLE

(76) Inventor: Michael J. Mc Kenna, 4400 38th Ave. N., St Petersburg, FL (US) 33713

( * ) Notice: Subject to any disclaimer, the term of this patent is extended or adjusted under 35 U.S.C. 154(b) by 0 days.

(21) Appl. No.: 09/797,624

(22) Filed: Mar. 5, 2001

(51) Int. Cl.$^7$ ............................................. F21V 33/00
(52) U.S. Cl. ..................... 362/473; 362/362; 362/427; 362/549
(58) Field of Search ................................ 362/473, 396, 362/427, 476, 475, 549

(56) References Cited

U.S. PATENT DOCUMENTS

| | | | |
|---|---|---|---|
| 3,641,491 A | | 2/1972 | Bath |
| 3,828,178 A | * | 8/1974 | Bickel ........................ 362/253 |
| 3,916,377 A | | 10/1975 | Demeter |
| 4,027,150 A | * | 5/1977 | Dean ........................... 340/432 |
| 4,085,317 A | | 4/1978 | Mithoff |
| 4,550,305 A | | 10/1985 | Bookbinder |
| 4,742,436 A | * | 5/1988 | Hoggett ..................... 362/269 |
| 5,012,396 A | * | 4/1991 | Costa ........................... 362/11 |
| 5,477,425 A | * | 12/1995 | Sun et al. ................... 362/191 |
| D397,475 S | | 8/1998 | Jacobs |
| 5,820,254 A | | 10/1998 | Duenas |

* cited by examiner

Primary Examiner—Sandra O'Shea
Assistant Examiner—Hargobind S. Sawhney

(57) ABSTRACT

A strobe lighting assembly for a motorcycle for improving the visibility of motorcycles for other motorists. The strobe lighting assembly for a motorcycle includes a support assembly being adapted to be mounted to a motorcycle; and also includes a light-emitting assembly being mounted to the support assembly and including a light-emitting member.

8 Claims, 2 Drawing Sheets

STROBE LIGHTING ASSEMBLY FOR A MOTORCYCLE

BACKGROUND OF THE INVENTION

1. Field of the Invention

The present invention relates to strobe lighting for a motorcycle and more particularly pertains to a new strobe lighting assembly for a motorcycle for improving the visibility of motorcycles for other motorists.

2. Description of the Prior Art

The use of strobe lighting for a motorcycle is known in the prior art, More specifically, strobe lighting for a motorcycle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,916,377; U.S. Pat. No. 5,820,254; U.S. Pat. No. 4,085,317; U.S. Pat. No. 4,550,305; U.S. Pat. No. Des. 397,475; and U.S. Pat. No. 3,641,491.

While these devices fulfill their respective, particular objectives and requirements, the aforementioned patents do not disclose a new strobe lighting assembly for a motorcycle. The inventive device includes a support assembly being adapted to be mounted to a motorcycle; and also includes a light-emitting assembly being mounted to the support assembly and including a light-emitting member.

In these respects, the strobe lighting assembly for a motorcycle according to the present invention substantially departs from the conventional concepts and designs of the prior art, and in so doing provides an apparatus primarily developed for the purpose of improving the visibility of motorcycles for other motorists.

SUMMARY OF THE INVENTION

In view of the foregoing disadvantages inherent in the known types of strobe lighting for a motorcycle now present in the prior art, the present invention provides a new strobe lighting assembly for a motorcycle construction wherein the same can be utilized for improving the visibility of motorcycles for other motorists.

The general purpose of the present invention, which will be described subsequently in greater detail, is to provide a new strobe lighting assembly for a motorcycle which has many of the advantages of the strobe lighting for a motorcycle mentioned heretofore and many novel features that result in a new strobe lighting assembly for a motorcycle which is not anticipated, rendered obvious, suggested, or even implied by any of the prior art strobe lighting for a motorcycle, either alone or in any combination thereof.

To attain this, the present invention generally comprises a support assembly being adapted to be mounted to a motorcycle; and also includes a light-emitting assembly being mounted to the support assembly and including a light-emitting member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new strobe lighting assembly for a motorcycle which has many of the advantages of the strobe lighting for a motorcycle mentioned heretofore and many novel features that result in a new strobe lighting assembly for a motorcycle which is not anticipated, rendered obvious, suggested, or even implied by any of the prior art strobe lighting for a motorcycle, either alone or in any combination thereof.

It is another object of the present invention to provide a new strobe lighting assembly for a motorcycle which may be easily and efficiently manufactured and marketed.

It is a further object of the present invention to provide a new strobe lighting assembly for a motorcycle which is of a durable and reliable construction.

An even further object of the present invention is to provide a new strobe lighting assembly for a motorcycle which is susceptible of a low cost of manufacture with regard to both materials and labor, and which accordingly is then susceptible of low prices of sale to the consuming public, thereby making such strobe lighting assembly for a motorcycle economically available to the buying public.

Still yet another object of the present invention is to provide a new strobe lighting assembly for a motorcycle which provides in the apparatuses and methods of the prior art some of the advantages thereof, while simultaneously overcoming some of the disadvantages normally associated therewith.

Still another object of the present invention is to provide a new strobe lighting assembly for a motorcycle for improving the visibility of motorcycles for other motorists.

Yet another object of the present invention is to provide a new strobe lighting assembly for a motorcycle which includes a support assembly being adapted to be mounted to a motorcycle; and also includes a light-emitting assembly being mounted to the support assembly and including a light-emitting member.

Still yet another object of the present invention is to provide a new strobe lighting assembly for a motorcycle that improves safety for motorcycles on roads.

Even still another object of the present invention is to provide a new strobe lighting assembly for a motorcycle that is easy and convenient to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
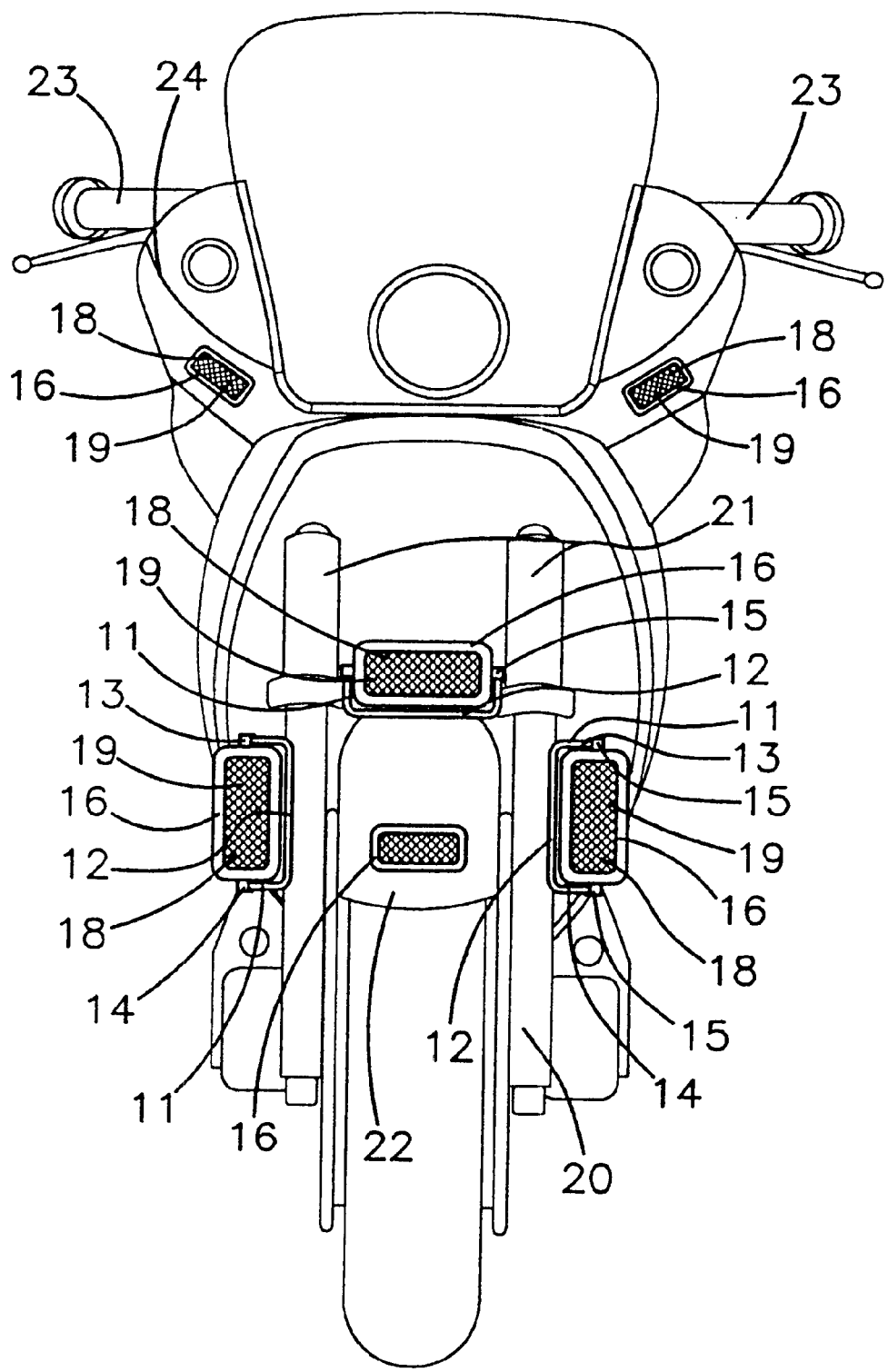
FIG. 1 is a front elevational view of a new strobe lighting assembly for a motorcycle according to the present invention and shown in use.
Figure 2:
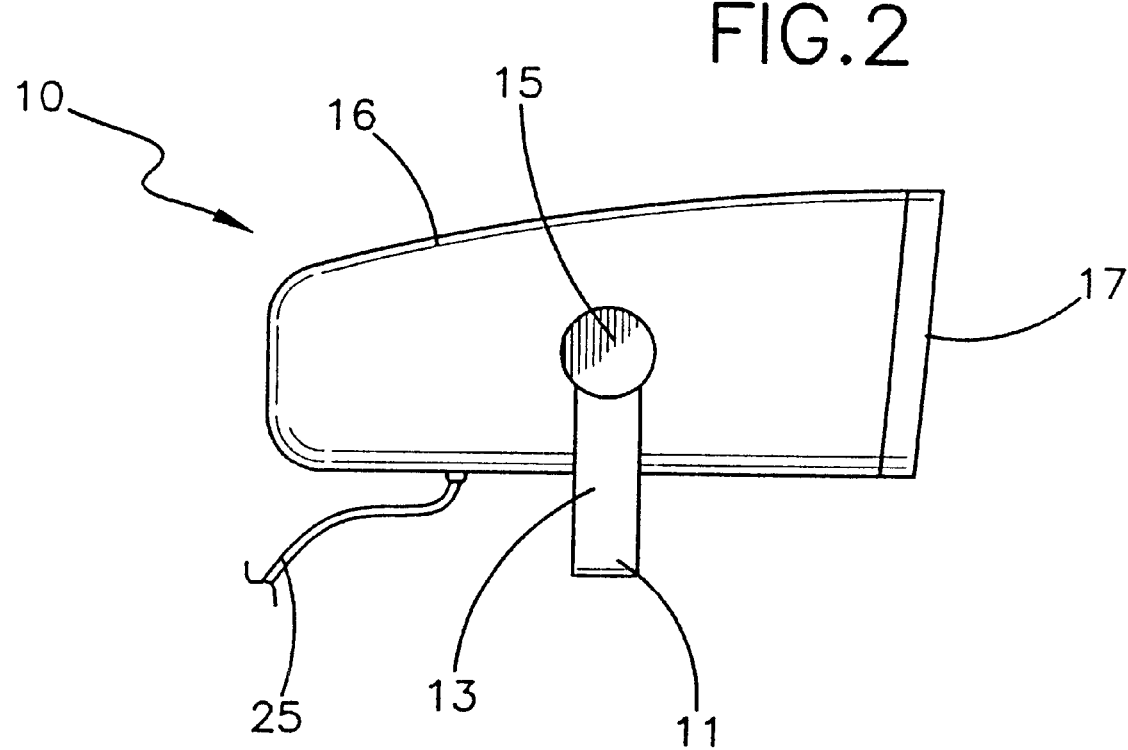
FIG. 2 is a side elevational view of the present invention.
Figure 3:
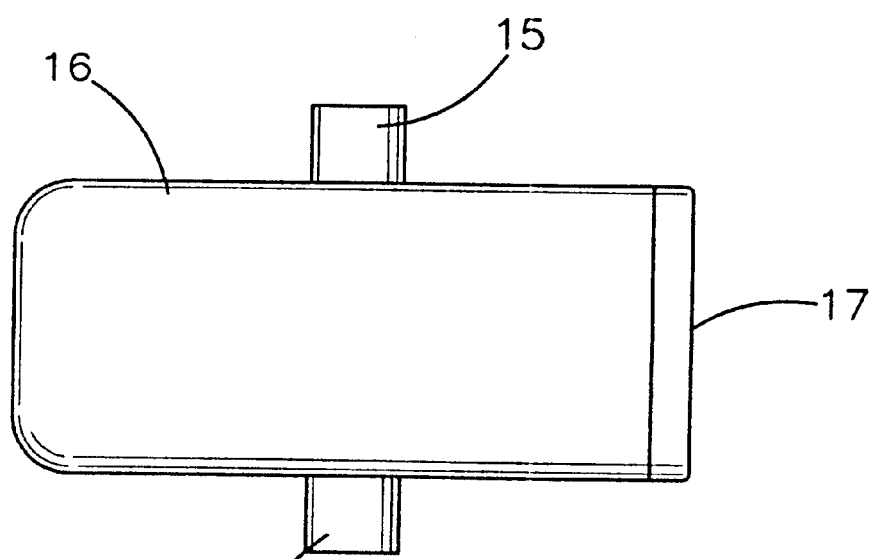
FIG. 3 is a top plan view of the present invention.

With reference now to the drawings, and in particular to FIGS. 1 through 3 thereof, a new strobe lighting assembly for a motorcycle embodying the principles and concepts of the present invention and generally designated by the reference numeral 10 will be described.

As best illustrated in FIGS. 1 through 3, the strobe lighting assembly for a motorcycle 10 generally comprises a support assembly 11 being adapted to be conventionally mounted to a motorcycle 20. The support assembly 11 including an adjustable bracket member 11 being adapted to be fastenable to fenders 22, to handlebars 23, to farrings 24 and to a frame 21 of the motorcycle 20, and also includes fastening members 15 being engagable to the bracket member 11. The bracket member 11 includes an elongate main portion 12 and end portions 13, 14 being angled relative to the elongate main portion 12.

A light-emitting assembly is conventionally mounted to the support assembly 11 and includes a light-emitting member 18. The light-emitting assembly also includes a housing 16 having an open front end 17 and being securely fastened to the bracket member 11 with the fastening member 15 and with the open front end 17 being adapted to be faced forward of the motorcycle 20, and further includes a protective member 19 being conventionally attached to the housing 16 at the open front end 17. The light-emitting member 18 is securely and conventionally disposed in the housing 16 and is arranged so that a beam of light from the light-emitting member 18 is directed out of the housing 16 through the open front end 17. The light-emitting member 18 includes a strobe light and is connected to a power cord 25 for energizing the light-emitting member 18. The housing 16 is generally oblong.

In use, the user connects the power cord 25 to the battery of the motorcycle 20 to energize the strobe light 18 which emits an intermittent beam of light so that other motorists will be able to see the motorcycle 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A strobe lighting assembly for a motorcycle comprising:

a support assembly for mounting to a motorcycle;

a light-emitting assembly being mounted to said support assembly and including a light-emitting member;

wherein said support assembly includes an adjustable bracket member being fastenable to the motorcycle; and wherein said bracket member of said support assembly includes an elongate main portion and end portions being angled relative to said elongate main portion.

2. A strobe lighting assembly for a motorcycle as described in claim 1, wherein said support assembly also includes fastening members being engagable to said bracket member.

3. A strobe lighting assembly for a motorcycle as described in claim 2, wherein said light-emitting assembly also includes a housing having an open front end, said housing being mounted to said bracket member with said fastening members and being oriented such that said open front end generally faces forward of the motorcycle, and further includes a protective member being attached to said housing at said open front end, said light-emitting member being securely disposed in said housing and being connected to power cord and being arranged so that a beam of light from said light-emitting member is directed out of said housing through said open front end.

4. A strobe light assembly for a motorcycle as described in claim 3, wherein said light-emitting member includes a strobe light.

5. A strobe lighting assembly for a motorcycle comprising:

a support assembly being mountable to a motorcycle;

a light-emitting assembly being mounted to said support assembly and including a light-emitting member;

wherein said support assembly includes an adjustable bracket member being fastenable to fenders, handlebars, a fairing, and a frame of the motorcycle, and also includes fastening members being engagable to said bracket member; and wherein said bracket member includes an elongate main portion and end portions being angled relative to said elongate main portion.

6. A strobe lighting assembly for a motorcycle as described in claim 5, wherein said light-emitting assembly also includes a housing having an open front end, said housing being mounted to said bracket member with said fastening members and being oriented such that said open front end generally faces forward of the motorcycle, and further includes a protective member being attached to said housing at said open front end, said light-emitting member being securely disposed in said housing and being connected to power cord and being arranged so that a beam of light from said light-emitting member is directed out of said housing through said open front end.

7. A strobe light assembly for a motorcycle as described in claim 6 wherein said light emmitng-member includes a strobe light.

8. A strobe lighting assembly for a motorcycle comprising:

a support assembly being mountable to a motorcycle, wherein said support assembly includes an adjustable bracket member being fastenable to fenders, handlebars, a fairing, and a frame of the motorcycle, and also including fastening members being engagable to said bracket member, said bracket member including an elongate main portion and end portions being angled relative to said elongate main portion; and a light-emitting assembly being mounted to said support assembly and including a light-emitting member, said light-emitting assembly also including a housing having an open front end, said housing being mounted to said bracket member with said fastening members and being oriented such that said open front end generally faces forward of the motorcycle, and further including a protective member being attached to said housing at said open front end, said light-emitting member being securely disposed in said housing and being arranged so that a beam of light from said light-emitting member is directed out of said housing through said open front end, said light-emitting member including strobe lights, said housing being generally oblong.

\* \* \* \* \*